United States Patent
Hilt et al.

(10) Patent No.: US 8,607,627 B2
(45) Date of Patent: Dec. 17, 2013

(54) WHEEL WITH ELECTROMECHANICAL CONVERSION SYSTEM

(75) Inventors: Thierry Hilt, Barraux (FR); Bruno Mourey, Coublevie (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 38 days.

(21) Appl. No.: 13/322,017

(22) PCT Filed: May 25, 2010

(86) PCT No.: PCT/EP2010/057188
§ 371 (c)(1),
(2), (4) Date: Nov. 22, 2011

(87) PCT Pub. No.: WO2010/136470
PCT Pub. Date: Dec. 2, 2010

(65) Prior Publication Data
US 2012/0067116 A1    Mar. 22, 2012

(30) Foreign Application Priority Data
May 25, 2009   (FR) ...................... 09 53412

(51) Int. Cl.
*B60C 23/02* (2006.01)
*B60C 23/04* (2006.01)

(52) U.S. Cl.
USPC ...................................... 73/146.5

(58) Field of Classification Search
None
See application file for complete search history.

(56) References Cited

U.S. PATENT DOCUMENTS

| | | |
|---|---|---|
| 3,453,590 A | 7/1969 | Burgess et al. |
| 6,368,065 B1 | 4/2002 | Hugenroth et al. |
| 6,392,313 B1 | 5/2002 | Epstein et al. |
| 7,415,874 B2 * | 8/2008 | Mancosu et al. .............. 73/146.5 |
| 2004/0126254 A1 | 7/2004 | Chen et al. |
| 2007/0063829 A1 | 3/2007 | Chien et al. |
| 2007/0074566 A1 * | 4/2007 | Roundy et al. ................... 73/146 |
| 2007/0295069 A1 * | 12/2007 | Mancosu et al. ................ 73/146 |
| 2010/0083747 A1 * | 4/2010 | Fink et al. ..................... 73/146.5 |
| 2010/0170332 A1 * | 7/2010 | Kammann et al. ............. 73/146.5 |
| 2011/0023592 A1 * | 2/2011 | Hortig et al. .................. 73/146.5 |
| 2011/0113876 A1 * | 5/2011 | Kammann .................... 73/146.5 |
| 2011/0296906 A1 * | 12/2011 | Laermer et al. .................. 73/146 |
| 2012/0085160 A1 * | 4/2012 | Dussinger et al. ........... 73/146.5 |

FOREIGN PATENT DOCUMENTS

| | | |
|---|---|---|
| EP | 0520271 | 6/1992 |
| EP | 0 520 271 | 6/1995 |
| FR | 2 897 486 | 8/2007 |
| WO | WO 03/056691 | 7/2003 |
| WO | WO 2006/095039 | 9/2006 |
| WO | WO 2007/082894 | 7/2007 |

* cited by examiner

*Primary Examiner* — Andre Allen
(74) *Attorney, Agent, or Firm* — Occhiuti & Rohlicek LLP

(57) ABSTRACT

A wheel includes a tire, an electrical device requiring power for operation, and a conversion system for providing electrical energy for powering the electrical device. The electrical energy is obtained from conversion of a difference between pressure of a gas confined under pressure within the tire and ambient pressure of air outside the tire. The conversion system includes an inlet nozzle fluidly connected to the gas confined under pressure in the tire, an outlet nozzle fluidly connected to the air outside the tire, a movable arm configured to be moved by gas expanding while flowing from the inlet nozzle to the outlet nozzle, and an electromechanical transducer capable of converting mechanical energy from movement of the arm into electrical energy used to power the electrical device.

10 Claims, 6 Drawing Sheets

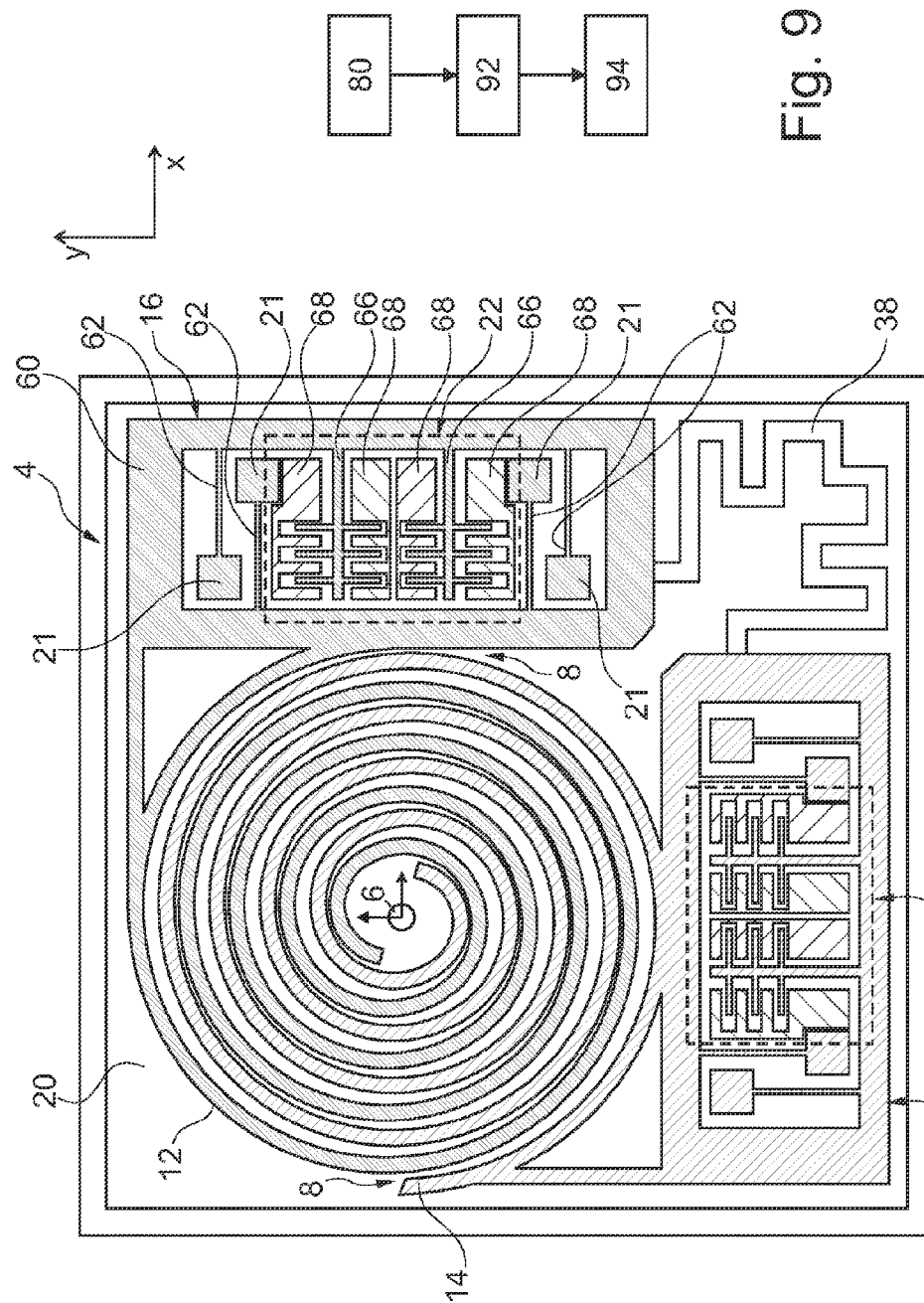

WHEEL WITH ELECTROMECHANICAL CONVERSION SYSTEM

CROSS REFERENCE TO RELATED APPLICATIONS

This application is the national stage entry under 35 USC 371 for PCT/EP2010/057188, filed May 25, 2010, which claims the benefit of the May 25, 2009 priority date of French Application No. 0953412. The contents of both the foregoing applications are incorporated herein by reference.

FIELD OF THE INVENTION

The invention relates to a wheel.

BACKGROUND

Wheels are used to equip vehicles such as automobiles.

A prior-art wheel is equipped with a tire and electrical device that needs to be powered in order to work.

Typically, the electrical device is a sensor of the difference in pressures between a gas confined under pressure within the tire and the free air present outside the tire. Such a sensor is used to inform the driver of an insufficiently inflated or punctured tire.

Generally, to protect this electrical device, it is housed inside the tire. It is then difficult to electrically connect it to the battery of the automobile in order to power it. It is also difficult to power this device by means of power cells. Indeed, these cells are then difficult to replace since they are situated inside the tire.

Other means have therefore been sought to power this electrical device. For example, it has been proposed to use the accelerations of the wheel, prompted for example by impacts or vibrations, to produce electrical energy inside the tire in order to power the electrical device. This solution to a great extent resolves the problems of powering the electrical device. However, when the automobile is not used over a long period, the battery used to trigger the conversion of the acceleration into electrical energy gets completely discharged. It is then no longer possible to power the electrical device.

SUMMARY

The invention seeks to resolve this problem. An object of the invention therefore is a wheel in which the device comprises a system for converting the difference in pressures between the gas confined under pressure within the tire and the free air present outside the tire into electrical energy used to power the electrical device.

In the above wheel, it is the difference in pressures between the gas confined in the tire and the free air that is used to generate electrical energy. Thus, electrical energy can be generated even when the wheel is immobile and therefore even after a lengthy period of absence of use of the automobile vehicle.

The embodiments of this wheel may comprise one or more of the following characteristics:
the system is equipped with:
an inlet nozzle fluidly connected to the gas confined under pressure and an outlet nozzle fluidly connected to the air present outside the tire,
at least one movable arm that can be moved under the action of the gas which expands in flowing from the inlet nozzle to the outlet nozzle, and
an electromagnetic transducer capable of converting mechanical energy from the movement of the arm into electrical energy used to power the sensor;
the wheel comprises a bottleneck capable of limiting the flow rate of the gas which flows from the inlet nozzle to the outlet nozzle to at least $10^{-5}$ m$^3$/s or $10^{-6}$ m$^3$/s;
the outlet nozzle is fluidly connected to the free air outside the tire by a hole capable of limiting the flow rate of the outwardly escaping gas to less than $10^{-8}$ m$^3$/s;
the electronic device is a sensor of the difference in pressures between the gas confined under pressure inside the tire and the free air present outside the tire;
the transducer is capable of converting the mechanical energy of movement of the arm into electrical energy that can be used in addition as a physical quantity representing the difference in pressures;
the sensor comprises a wireless transmitter capable of transmitting a value representing the difference in measured pressures to a remote receiver by means of a wireless link, this transmitter being powered solely with the electrical energy produced by the system;
the system comprises at least two movable arms between which the fluid flows to pass from the inlet nozzle to the outlet nozzle in moving these arms relatively to each other, these arms being formed and movable so that, during their movement, they define at least one pocket of fluid which moves away from the inlet nozzle to then meet the outlet nozzle while at the same time increasing in volume;
the arms are formed as spirals imbricated in each other;
the electrical device is a sensor of the difference in pressures between the gas confined under pressure inside the tire and the free air present outside the tire and the conversion system is different from a microsystem equipped with two movable arms between which there flows the fluid to pass from the inlet nozzle into the outlet nozzle in moving these arms relatively to each other, these arms being spiral shaped and movable so that, during their movement, they define at least one pocket of fluid that moves away from the inlet nozzle and then meets the outlet nozzle while at the same time increasing in volume.

These embodiments of the wheel furthermore have the following advantages:
using a bottleneck that limits the flow rate of gas to at least $10^{-5}$ m$^3$/s prevents the wheel from getting deflated far too rapidly,
limiting the flow rate to less than $10^{-8}$ m$^3$/s makes it possible to produce electrical energy continuously for more than six months while at the same time generating a negligible loss of pressure,
using in addition the quantity of electrical energy produced as a physical quantity representing the difference in pressures between the confined gas and the free air enables a sensor of this difference in pressures to be made in a simple way,
powering a wireless transmitter with electrical energy produced from the difference in pressures gives an autonomous pressure difference sensor,
using arms formed and movable so that, during their movement, they define at least one pocket of gas flow which moves away from the inlet nozzle to then come to the outlet nozzle makes it possible to convert the difference in pressures into a mechanical movement with very high energy efficiency even for very low gas flow rates. Furthermore, it is not necessary to provide for a non-return valve at the inlet nozzle.

DESCRIPTION OF THE FIGURES

The invention will be understood more clearly from the following description, given purely by way of a non-exhaustive example and made with reference to the appended figures, of which:

FIG. 8 is a schematic illustration of a possible embodiment of the microsystem of FIG. 5, FIG. 9 is a flowchart of a method for manufacturing the microsystem of FIG. 5, FIGS. 10 to 12 are schematic illustrations in section of different steps of the method for manufacturing the microsystem of FIG. 5.

In these figures, the same references are used to designate the same elements.

DETAILED DESCRIPTION

Here below in this description, the characteristics and functions well known to those skilled in the art are not described in detail.

Figure 1:
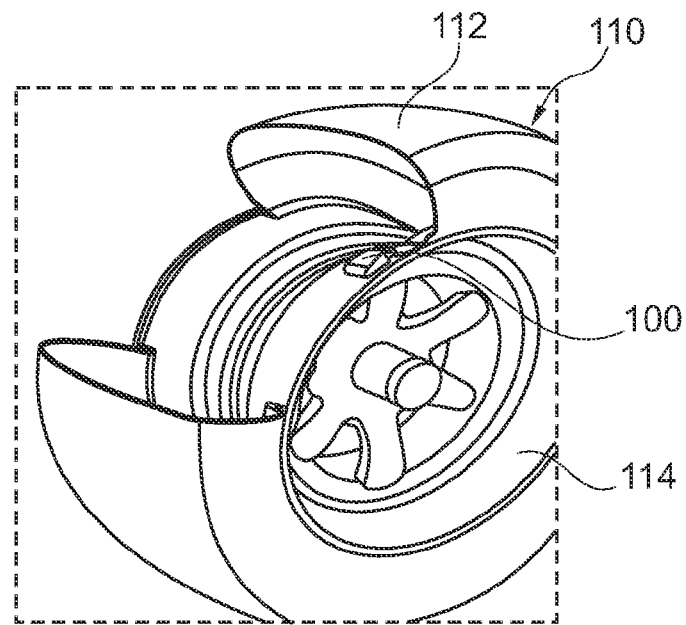
FIG. 1 is an illustration in a partial sectional view of a wheel incorporating an electronic device.

FIG. 1 shows the wheel 110 equipped with:

a tire 112 within which compressed gases are confined,
an electrical device 100 that needs to be powered with electrical energy in order to work.

Here below in this description, the compressed gas is considered to be compressed air used to inflate the tire. However, other gases such as nitrogen can be used to inflate the tire 112.

The wheel 2 is for example the wheel of an automobile vehicle such as a car.

The tire 112 is mounted on the rim 114. The device 100 is situated inside the tire 112 which serves as a protective casing for this device.

Figure 2:
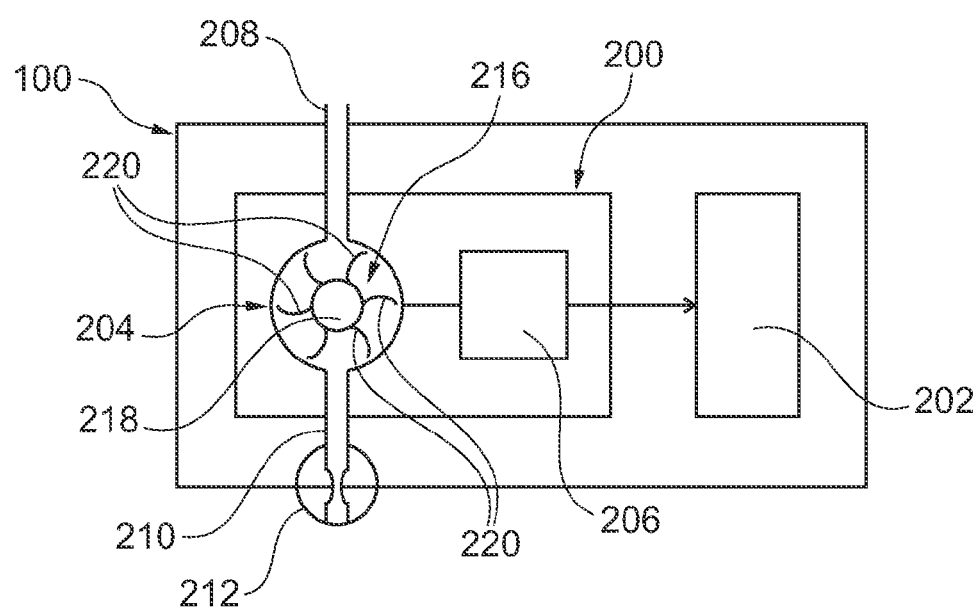
FIG. 2 is a more detailed schematic illustration of the electronic device of FIG. 1.

FIG. 2 provides a more detailed view of the general architecture of the device 100. The device 100 has a system 200 for converting the difference in pressures between the air confined under pressure within the tire 112 and the free air present outside this tire into electrical energy. The free air is at atmospheric pressure. This electrical energy is used to power a set 202 of electrical components of the device 100.

The set 202 has electrical components needed for the system 200 to work as well as other electrical components needed to execute the different functions that must be performed by the device 100. For example, the set 202 has a wireless transmitter/receiver of information as well as an electronic control unit.

The system 200 comprises:

a transducer 204 capable of converting the difference in pressures between the confined air and the free air into mechanical energy, and
a transducer 206 capable of converting this mechanical energy into electrical energy used to power the unit 202.

The transducer 204 includes an inlet nozzle 208 fluidly connected to the air confined within the tire 112 and an outlet nozzle 210 fluidly connected to the free air.

At least one of the nozzles 208 or 210 forms a bottleneck 212 capable of limiting the flow rate of air going through the transducer 204.

This bottleneck 212 is shaped so that the flow rate of air is very low, i.e. lower than 100 mL/s, 10 mL/s or 1 mL/s. For example, here the bottleneck 212 is shaped so as to allow only a flow rate of air below 100 µL/s and preferably below or equal to 10 µL/s.

With such a flow rate of 100 µL/s, the leakage effected through the tire 112 by the transducer 204 represents, for a tire whose volume of air is equal to $3.94 \times 10^{-2}$ m$^3$, a drop in pressure of 8 mBar at the end of six months, which is negligible. Thus, the device 100 is capable of working for more than six months without in any way requiring the owner of the vehicle to re-inflate the tire 112.

Between the nozzles 208 and 210, the transducer 204 has at least one arm which can move under the action of the air which expands when flowing from the nozzle 208 to the nozzle 210.

In the particular case shown in FIG. 2, the part that moves under the action of the air that expands is a turbine 216 formed by a central core 218 and several peripheral blades 220. Each blade 220 corresponds to a moveable arm. This turbine is driven in rotation by the air which flows from the nozzle 208 to the nozzle 210.

To limit the space requirement of the device 100, the device 200 is a microsystem.

The microsystems are for example MEMS (micro-electromechanical systems). These microsystems differ from macroscopic mechanical systems also by their method of manufacture. These microsystems are made by using the same batch manufacturing methods as those used to make microelectronic chips. For example, the microsystems are made with wafers made of monocrystalline silicon or glass machined by photolithography and etching (for example DRIE or deep reactive ion etching) and/or structured by epitaxial growth and deposition of metallic material.

As a result of these manufacturing methods, the microsystems are small and generally have machined parts or portions of parts having at least one dimension in the micrometer range. The dimension in the micrometer range is generally smaller than 200 µm and goes, for example, from 1 to 200 µm.

Embodiments of transducers 204 and 206 in microsystem form are known.

For example, reference may be made on this subject to the U.S. Pat. No. 6,392,313 for an example of an embodiment of a microturbine capable of expanding a compressed gas and a transducer associated with this microturbine to convert the rotation of the microturbine into electrical energy. For example, the microsystem 200 is identical to the one described in the U.S. Pat. No. 6,392,313 except for the fact that the pressurized gas results not from the combustion of a combustible mixture but corresponds to the air confined under pressure within the tire 112. Thus, the set of the elements of the micromotor described in the U.S. Pat. No. 6,392,313 and used to compress a gas can be omitted. For example, with regard to FIG. 1 of the U.S. Pat. No. 6,392,313, the microcompressor (disk 18, blade 20 etc) the fuel injector 24, the combustion microchamber 30, etc can be omitted.

Here, the turbine 216 is identical to the one described with reference to FIG. 1 of the U.S. Pat. No. 6,392,313 (valve 34, disk 36, blade 38, shaft 40, etc).

Figure 6:
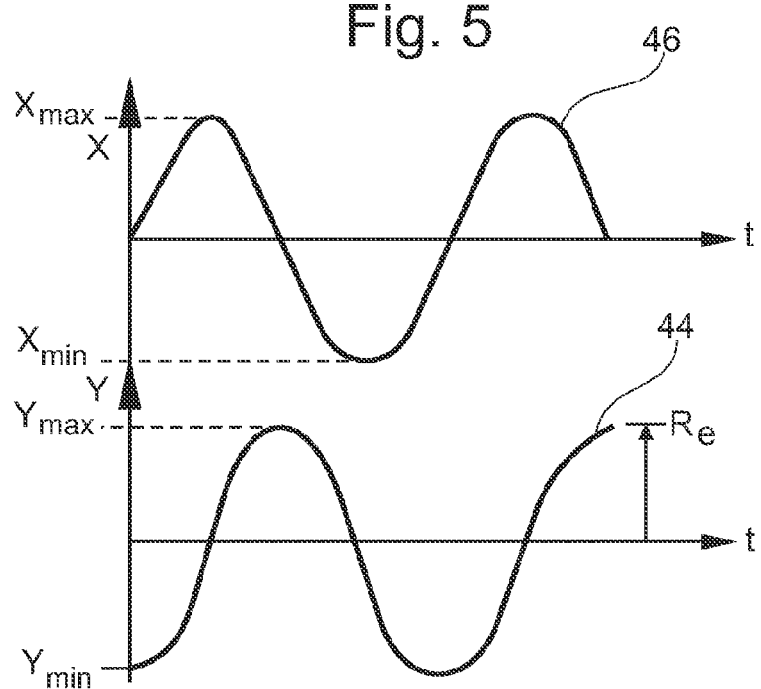
FIG. 6 is a graph showing the movement of the arm of the microsystem of FIG. 5 as a function of time.
Figure 7:
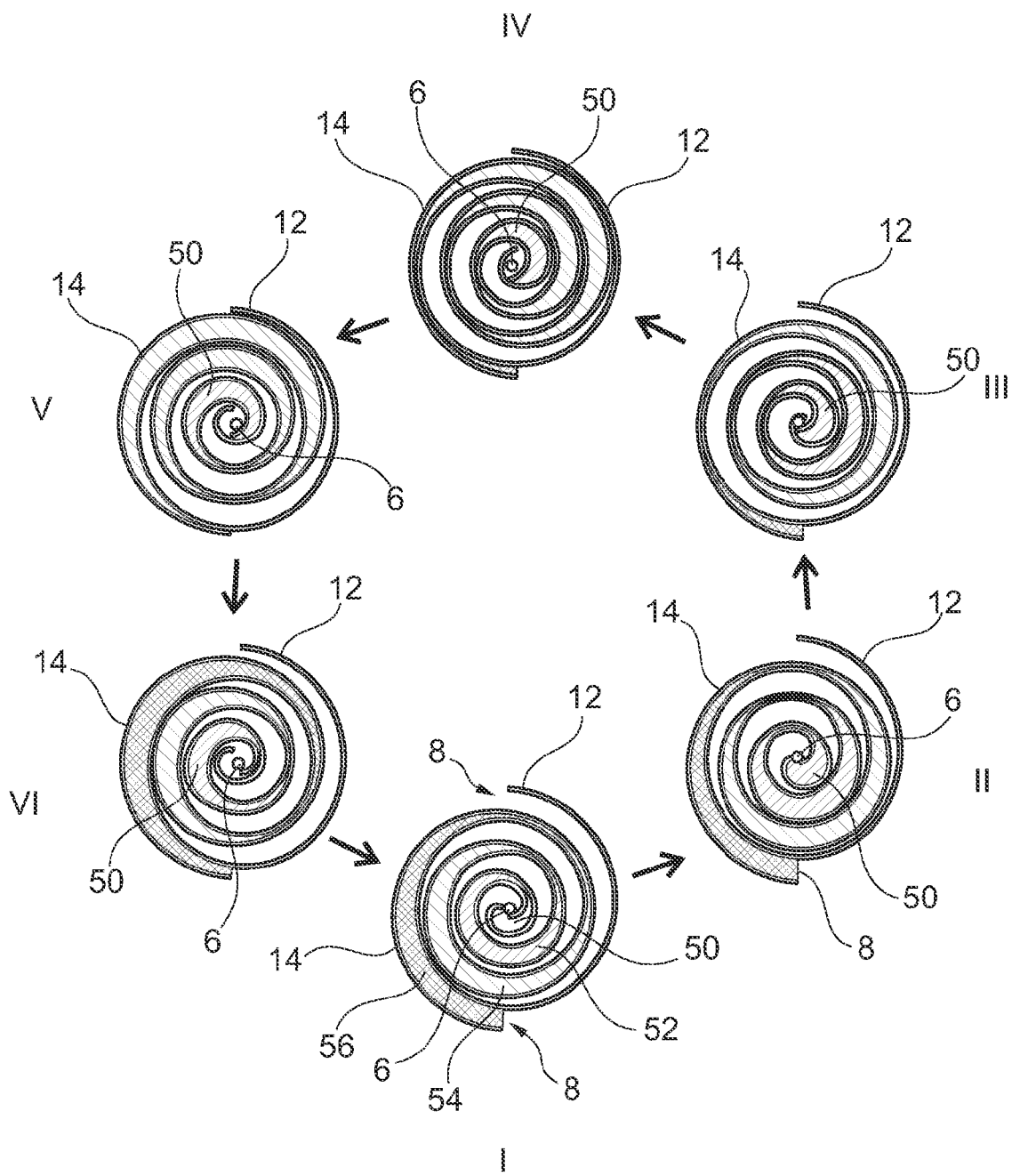
FIG. 7 is a schematic illustration of the working of the microsystem of FIG. 5.

One embodiment of the transducer 206 is described for example with reference to FIG. 6 of the U.S. Pat. No. 6,392,313.

Many other embodiments of the transducers 204 and 206 are possible. In particular, embodiments with a single oscillating arm are described for example in the patent applications WO 03 05 6691 and WO 2006/095039.

A particular embodiment of the transducers 204 and 206 is also described further below with reference to FIGS. 5 to 8.

Figure 3:
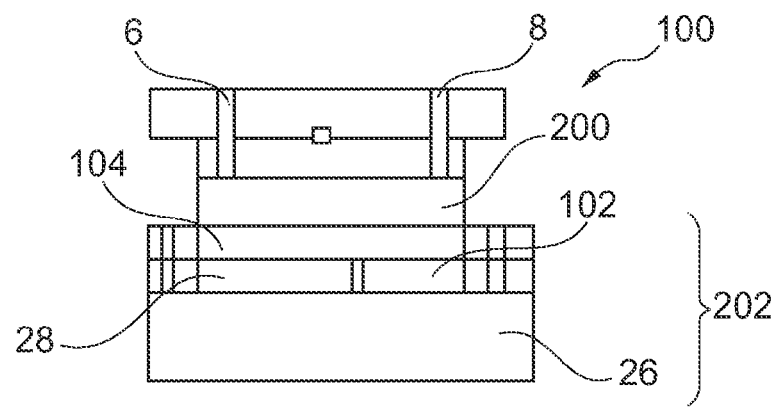
FIG. 3 is a schematic illustration of the device of FIG. 1 when this device is a sensor of a difference in pressures.

FIG. 3 shows the device 100 in the particular case where it is a sensor of the difference in pressures between the air confined under the pressure within the tire 112 and the free air outside this tire.

To this end, the device 100 exploits the fact that the difference in pressures between the nozzles 208 and 210 is a function, for example proportionally, of the mechanical energy produced by the movements of the arm or arms of the transducer 204. Furthermore, since the electrical energy produced by the transducer 206 is a function of the mechanical energy received, this electrical energy is also a function of the difference in pressures between the nozzles 208 and 210. It is this property of the system 200 that is used to make a sensor of differences in pressures.

To this end, in FIG. 3, the unit 202 comprises:
- a device 26 for storing the electrical energy generated by the system 100, such as a capacitor,
- a unit 28 for controlling the system 200,
- a circuit 102 for managing the charging and discharging of the device 26, and
- a radio transmitter 104 capable of communicating a piece of information representing the difference in pressures between the nozzles 208 and 210 to a remote radio receiver.

For example, the device 100 activates the sending of a characteristic signal through the transmitter 104 as soon as the charging of the device 26 exceeds a predetermined threshold $F_1$. Thus, the time that elapses between two transmissions is a function, for example proportionally, of the difference in measured pressures. It is therefore possible, from the data received, to deduce the difference in pressures between the nozzles 208 and 210.

Here, the threshold $F_1$ is fixed so as to enable the powering of the unit 202 and in particular of the transmitter 104 so that it sends a characteristic pulse. Thus, in this embodiment, the device 100 does not need any other external power sources in order to work. Indeed, as an energy source, it uses only the difference in pressures between the nozzles 208 and 210. Therefore, the device 100 is said to be autonomous in energy since it does not need sources of energy other than that extracted from the difference in pressures.

Figure 4:
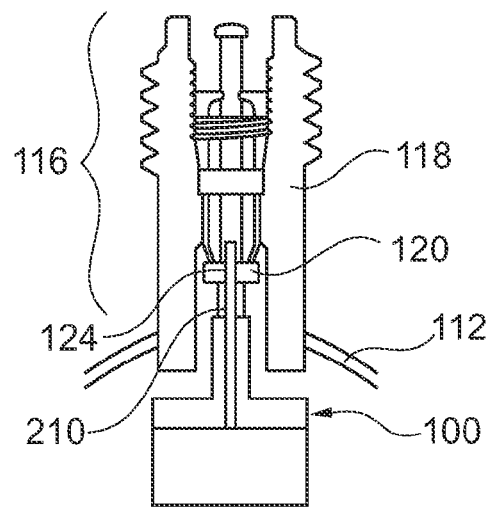
FIG. 4 is a schematic illustration in section of a valve of the wheel of FIG. 1.

FIG. 4 represents a possible example of the mounting of the device 100 within the tire 112. More specifically, the tire 112 has a valve stem 116 through which the wheel 110 can be inflated. Classically, this valve stem consists of a sleeve 118 fixed without any degree of freedom to the tire 112 and a mobile check valve 120. This check valve 120 can be shifted between a resting position in which it hermetically seals the tire and an active position in which it enables compressed air to be introduced into the tire 112.

Here, a hole 124 is made through the check valve 120 to enable the passage of the nozzle 210 through this check valve 120 and thus connect it to the outside air.

In this embodiment, the device 100 is fixed without any degree of freedom to the check valve 120.

Thus, when the check valve 120 is in its resting position, the compressed air leaks through the device 100 and the hole 124. The flow rate of the air leakage is very low, i.e. less than 1 mL/s. For example here, the hole 124 is sized so as to enable a leakage of air only below 100 µL/s and preferably below or equal to 10 µL/s.

Figure 5:
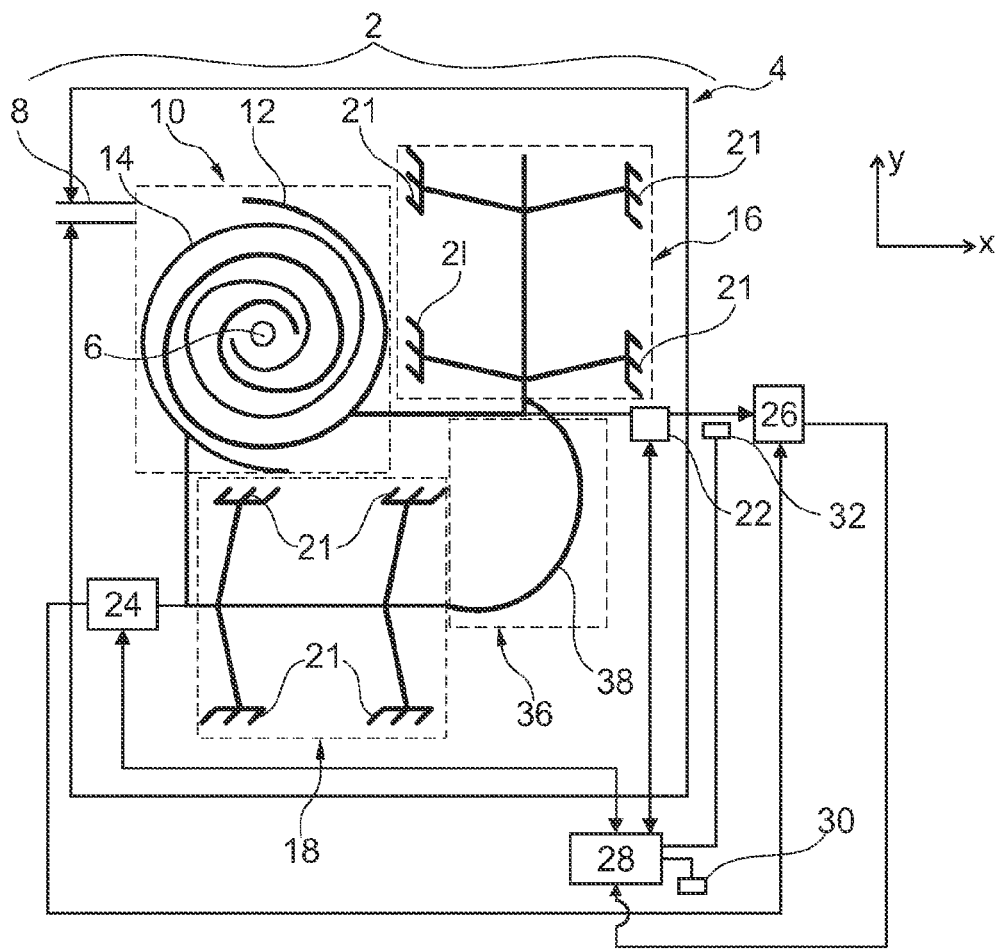
FIG. 5 is a drawing showing the principle of a microsystem for converting a difference in pressures in a fluid into a mechanical movement.

FIG. 5 represents a particular case of a microsystem 2 for converting a difference in pressures in a fluid into mechanical movement. This microsystem 2 is capable of being used as a system 200 in the embodiments described with reference to FIGS. 1 to 4.

The microsystem 2 has a closed chamber 4 fluidly connected to the compressed fluid by means of an inlet nozzle 6 and fluidly connected to the expanded fluid by means of an outlet nozzle 8. The chamber 4 is hermetically sealed so that the expanded fluid in this chamber cannot escape by ways other than the nozzle 8.

Within the chamber 4, the nozzle is fluidly connected to a "roller expander" 10. The roller expander is also known as a "scroll" expander.

The expander 10 is formed by two arms 12 and 14 movable relatively to each other. The arms 12 and 14 are formed and movable so that, when they move under the effect of the fluid allowed in by the nozzle 6, they define at least one pocket of fluid that moves away from the nozzle 6 and then moves closer to the nozzle 8 while at the same time increasing in volume. For example, the arms 12 and 14 are shaped as spirals and are imbricated with one another. Each spiral has at least one or even more turns to define several pockets of fluid that move at the same time from the nozzle 6 to the nozzle 8. Each arm is mechanically connected by means of respective connections 16 and 18 to a fixed plane 20 (FIG. 8). To simplify FIG. 5, only the points of anchoring 21 to the plane 20 are shown in this figure. The plane 20 extends in parallel to orthogonal directions X and Y. Preferably, the connections 16 and 18 are elastic.

The connections 16 and 18 enable only a movement in translation of the arms 12 and 14 along the directions Y and X respectively.

Each arm 12, 14 is also mechanically connected to a respective electromechanical transducer 22, 24. Each electromechanical transducer is capable of converting the mechanical motion of the arm into electrical energy.

For example, each of the transducers 22, 24 is connected at output to an electrical energy storage device such as the device 26 (FIG. 3)

The transducers 22 and 24 are electromechanical transducers controllable so as to regulate the quantity of mechanical energy converted into electrical energy. They therefore also fulfill the function of a controllable damping device.

These transducers 22 and 24 are controlled by a control unit 28 (FIG. 3). The unit 28 is connected to sensors 30 and 32 of a physical value representing the electrical power produced respectively by the transducers 24 and 22. The sensors 30 and 32 can also be used to measure the phase of the electrical power produced.

A mechanical phase-shifter 36 is mechanically connected between the arms 12 and 14. This phase-shifter has the function of mechanically assisting in the obtaining of a π/2 radian phase shift between the oscillatory (to-and-fro) motions of the arms 12 and 14. Furthermore, this phase-shifter 36 is formed by a spring 38 mechanically connected to the arms 12 and 14. For example, this spring 38 is a leaf spring. This spring 38 converts the system formed by the two arms 12 and 14 and the spring 38 into a system that is resonant for a resonance frequency. The resonance frequency is attained when the phase shift between the oscillatory motions of the arms 12, 14 is a π/2 radian shift. At the resonance frequency, the energy efficiency of the microsystem is at the maximum.

The unit 28 is capable of commanding the transducers 22 and 24 to work at the resonance frequency. For example, on the basis of the information measured by the sensors 30 and 32, the unit 28 computes the phase shift between the oscillatory motions of the arms 12 and 14 and sets up an automatic feedback control of this phase shift to slave it to the value $\pi/2$.

To limit the energy consumed by the microsystem 2 during its operation, the unit 28 is itself powered with the electrical energy produced by the transducers 22 and 24. To this end for example, the unit 28 is electrically connected to the electrical energy storage device.

FIG. 6 shows the progress in time of the movements of the arms 12 and 14 respectively along the directions Y and X. More specifically, the curves 44 and 46 represent the movements respectively of the arms 12 and 14. These movements are sinusoidal and phase-shifted relatively to each other by $\pi/2$ radians.

In stationary mode, each arm describes an oscillatory or to-and-fro motion between two extreme positions denoted as $X_{max}$ and $X_{min}$ for the arm 14 and $Y_{max}$ and $Y_{min}$ for the arm 12 in FIG. 2.

The movement of the arms 12, 14 defines several pockets of fluid which move circularly from the nozzle 6 to the nozzle 8, while increasing in volume. More specifically, each pocket of fluid moves in rotating around the nozzle 6 and at the same time in moving away from it.

FIG. 3 gives a more detailed view of the movement of a pocket 50 of fluid from the nozzle 6 to the nozzle 8.

Initially (state I), the pocket 50 is in fluidic communication with the nozzle 6. This pocket 50 then gets filled with a compressed fluid. Then (state II), the arms 12 and 14 move relatively to one another to fluidly isolate this pocket 50 from the nozzle 6.

Then, as illustrated by the successive states (state III to state VI), the pocket 50 moves from the nozzle 6 to the nozzle 8 in describing a spiral motion about the nozzle 6. More specifically, after the arms 12 and 14 have each performed a complete to-and-fro motion, the pocket 50 passes from the positions shown in state I to the position 52 shown in state I. It has therefore completed a full rotation about the nozzle 6.

Here, since the spiral-shaped arms 12 and 14 are wound several times around the nozzle 6, at the next oscillatory cycle of the arms 12 and 14, the pocket 50 performs another rotation about the nozzle 6 but in moving away slightly further from this nozzle 6. More specifically, after another full turn, the pocket 50 occupies the position 54 (state I). Finally, at its last turn, the pocket 50 occupies the position 56 (state I). In the state 56, the pocket is in fluid communication with the nozzle 8 thus enabling the expanded fluid to escape.

Here, the arms 12 and 14 are shaped so as to simultaneously define at least two pockets that move at the same time from the nozzle 6 to the nozzle 8 while increasing in volume. In the particular case shown in FIG. 3, the arms 12 and 14 are shaped to define six pockets of fluid that move simultaneously from the nozzle 6 to the nozzle 8.

It can therefore be understood that, when the fluid expands in the expander 10, the energy of this expansion is converted into a mechanical movement of the arms 12 and 14. In the particular case shown in FIG. 1, this mechanical movement is converted by the transducers 22 and 24 into electrical energy.

FIG. 8 shows a possible example of implementation of the microsystem 2.

For example, except for the positions, the connection 16 and the transducer 22 are identical with the connection 18 and the transducer 24. Thus, only the connection 16 and the transducer 22 are described here in greater detail.

The connection 16 is made here by means of a parallelogram 60 fixed without any degree of freedom to the arm 12. This parallelogram 60 therefore moves in translation along the direction Y in parallel to the plane 20. The parallelogram 60 is mechanically connected to the plane 20 by means of beams 62. Each beam 62 has one end fixed without any degree of freedom to the parallelogram 60 and the other end fixed to the anchoring point 21 itself fixed without any degree of freedom to the plane 20. The beam 62 is not directly fixed to the plane 20. Preferably, each beam 62 extends in parallel to the direction X. Furthermore, each beam 62 is thin enough to be able to get twisted when the fluid expands in the pockets defined between the arms 12 and 14. Through this configuration, the arm 12 can move solely along the direction Y.

The transducer 22 uses for example a variable-capacitance capacitor to convert the mechanical energy produced by the movement of the arm 12 into electrical energy. The conversion of mechanical energy into electrical energy by means of variable capacitors is well known. For example, this is described in the patent applications WO2007 082 894 and FR2 897 486. Thus, this conversion mechanism shall not be described in detail. Here, the capacitor is made by means of interdigitated combs. More specifically, one capacitor plate 66 of the capacitor is fixed without any degree of freedom to the parallelogram 60. The other capacitor plate 68 of this capacitor is fixed without any degree of freedom to the plane 20. Thus, when the parallelogram 60 moves, it modifies the capacitance of the capacitor, which is then used to convert the mechanical energy into electrical energy. Preferably, at least one of the capacitor plates of the capacitor has electrets. Indeed, this enables the transducer 22 to start producing electrical energy without any preliminary additional input of electrical energy from an external electrical energy source.

One example of the method of manufacture of the microsystem 2 shall now be described with reference to the method of FIG. 9 and by means of the illustrations of FIGS. 10 to 12.

Initially, at a step 80, a plate comprising a sacrificial intermediate layer 82 is etched. Typically, this plate is an SOI (silicon-on-insulator) plate. Thus, in addition to the sacrificial layer 82, this plate comprises on the one hand a silicon layer 84 and on the other hand a layer of insulator 86. At the step 80, the spirals, the connections and the variable-capacitance capacitor are simultaneously etched in the layer 84. In FIG. 6, the microsystem thus etched is represented by a block 90. The block 90 lies on the layer 82.

Then, at a step 92, the layer 82 situated beneath the block 90 is eliminated. For example, chemical etching is used to eliminate the sacrificial layer. From this instant onwards, the spirals 12 and 14 and the parallelograms of the connections as well as the capacitor plates 66 of the variable-capacitance capacitors can move in translation relatively to the plane 20 constituted by the upper face of the layer 86 (see FIG. 11).

Then, at a step 94, a cap 96 is made and this cap is fitted above the layer 84. For example, the cap 96 is made out of glass. The nozzles 6 and 8 are made in this cap 96. Only the nozzle 6 has been shown in FIG. 8.

Holes providing access to the layer 84 are also made in the cap 96 to electrically connect the transducers 22 and 24 to the control unit 28 and to the energy storage device 26. In FIG. 8, only one access hole 98 to the layer 84 has been shown.

Figure 10:
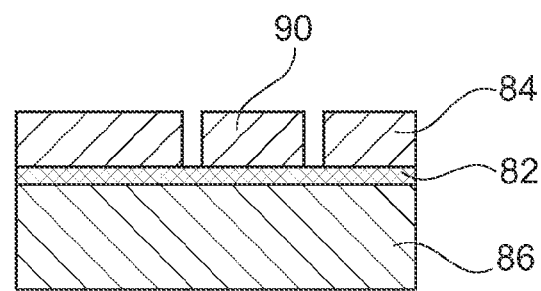
Figure 11:
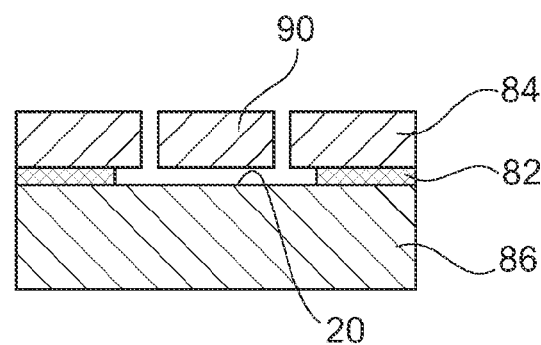
Figure 12:
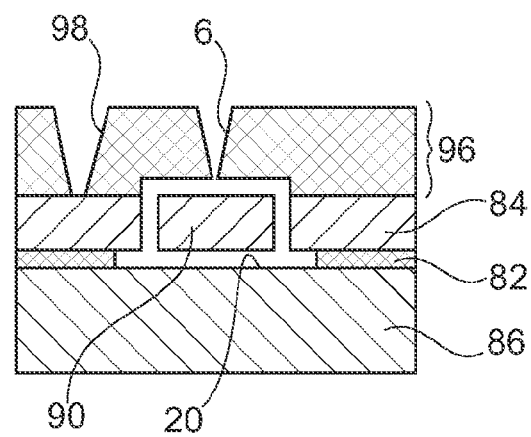

It will be noted that the thickness of the layer 82 as well as the space between the cap 96 and the block 90 have been exaggerated in FIGS. 10 to 12. In practice, the thickness of the layer 22 and the space between the cap 96 and the block 90 are small enough for the fluid, expanding in the expander 10, to remain confined between the arms 12 and 14.

Many other embodiments are possible. For example, it is not necessary for the device 100 to be autonomous. It can also use the electrical energy produced by other energy sources such as, for example, a rechargeable contactless power cell by means of an apparatus external to the wheel. In an another embodiment, the system 200 is combined with another system for producing electrical energy such as a system capable of converting accelerations undergone by the wheel into electrical energy.

The system 200 is not necessarily a microsystem. As a variant, it may be a macroscopic system.

The electrical device is not necessarily a sensor of the difference in pressures. For example, it may be a sensor of the adhesion of the tire 112 to the road or a temperature sensor. Nor is the electrical device necessarily a sensor. For example, the unit 202 may comprise a luminous indicator or the like so as to enable this luminous indicator to be powered from the difference in pressures between the air confined inside the tire and the free air.

Many other embodiments are possible. For example, the arms 12 and 14 can be mechanically pre-stressed so that, whatever the position of these arms, there is always at least one elastic connection which has a non-zero elongation, i.e. it is not in its position of rest.

Various different forms of spirals are possible for the arms 12 and 14. For example, the form may be that of a volute or an Archimedean screw. Each arm may have one or more spirals.

It is not necessary for the arms 12 and 14 to be mounted in translation along perpendicular axes. Indeed, it is enough for the axes along which the arms 12 and 14 move to be not parallel. If the angle between these axes is different from $\pi/2$ radians, then the phase shift between the oscillatory motions of the arms 12 and 14 must be adapted accordingly.

Nor is it necessary for the arms 12 and 14 to work at the resonance frequency.

In one simplified embodiment, the mechanical phase-shifter 36 can be omitted. In this case, the predetermined phase shift between the motions of the arms can be achieved by an electrical actuator, for example an electromechanical transducer.

The mechanical phase shift can also be made without using a spring. For example, it can be made by means of a rod-and-crank mechanism.

For the conversion of a difference in pressures into a mechanical motion, the conversion of the mechanical energy thus produced into electrical energy is optional. Indeed, for the system 2 to work, it is enough to have controllable dampers enabling automatic feedback control over the movements of the arms 12 and 14 to maintain an appropriate phase shift.

Many other modes of manufacturing the microsystem 2 are possible. In particular, the etching steps can be replaced by steps of deposition.

The invention claimed is:

1. A wheel comprising a tire, an electrical device requiring power for operation, and a conversion system for providing electrical energy for powering the electrical device, the electrical energy being obtained from conversion of a difference between pressure of a gas confined under pressure within the tire and ambient pressure of air outside the tire, wherein the conversion system comprises: an inlet nozzle fluidly connected to the gas confined under pressure in the tire, an outlet nozzle fluidly connected to the air outside the tire, at least one movable arm configured to be moved by gas expanding while flowing from the inlet nozzle to the outlet nozzle, and an electromechanical transducer configured for converting mechanical energy from movement of the arm into electrical energy used to power the electrical device.

2. The wheel of claim 1, further comprising a bottleneck for limiting flow rate of gas that flows from the inlet nozzle to the outlet nozzle to at least $10^{-5}$ cubic meters per second.

3. The wheel of claim 1, further comprising a bottleneck for limiting flow rate of gas that flows from the inlet nozzle to the outlet nozzle to at least $10^{-6}$ cubic meters per second.

4. The wheel of claim 1, wherein the outlet nozzle is fluidly connected to the ambient air outside the tire by a hole configured for limiting the flow rate of the outwardly escaping gas to less than $10^{-8}$ cubic meters per second.

5. The wheel of claim 1, wherein the electrical device comprises a sensor for sensing a difference between pressure in the gas confined under pressure inside the tire and pressure of ambient air present outside the tire.

6. The wheel of claim 1, further comprising a transducer for converting the mechanical energy of movement of the arm into electrical energy to be used as a physical quantity representing the difference in pressures.

7. The wheel of claim 5, further comprising a wireless transmitter configured for transmitting a value representing the measured difference in pressures to a remote receiver by a wireless link, the transmitter being powered solely by electrical energy produced by the conversion system.

8. The wheel of claim 1, wherein the conversion system comprises at least two movable arms, wherein, while passing from the inlet nozzle to the outlet nozzle, fluid flows between the arms and moves at least one of the arms relative to another of the arms, wherein, the arms are configured to define, in motion, a pocket of fluid that moves away from the inlet nozzle and toward the outlet nozzle, and wherein the pocket of fluid increases in volume as it proceeds from the inlet nozzle to the outlet nozzle.

9. The wheel of claim 8, wherein the arms form spirals imbricated with each other.

10. The wheel of claim 1, wherein the conversion system comprises a micro-system equipped with two movable arms between which there flows fluid that moves the arms relative to each other while passing from the inlet nozzle into the outlet nozzle, the arms being formed in a spiral shape and movable, the arms, in motion, defining a pocket of fluid that increases in volume while moving away from the inlet nozzle toward the outlet nozzle.

* * * * *